United States Patent
Zhao et al.

(10) Patent No.: US 10,847,968 B2
(45) Date of Patent: Nov. 24, 2020

(54) DIFFERENTIAL PROTECTION METHOD AND SYSTEM

(71) Applicants: TAIZHOU POWER SUPPLY COMPANY OF STATE GRID ZHEJIANG ELECTRIC POWER, Zhejiang (CN); STATE GRID CORPORATION OF CHINA, Beijing (CN)

(72) Inventors: Ping Zhao, Zhejiang (CN); Yiping Shen, Zhejiang (CN); Yutao Qiu, Zhejiang (CN); Hua Xu, Zhejiang (CN); Hao Tan, Zhejiang (CN); Rijun Wang, Zhejiang (CN); Yuande Zheng, Zhejiang (CN); Hao Li, Zhejiang (CN); Zaibing Zhou, Zhejiang (CN); Guode Ying, Zhejiang (CN); Kang Wang, Zhejiang (CN); Jian Wu, Zhejiang (CN); Tao Zhu, Zhejiang (CN); Ben Li, Zhejiang (CN); Xiaochun Xu, Zhejiang (CN); Qingchun Zhao, Zhejiang (CN); Xiaotong Zhu, Zhejiang (CN); Zhen Huang, Zhejiang (CN)

(73) Assignees: TAIZHOU POWER SUPPLY COMPANY OF STATE GRID ZHEJIANG ELECTRIC POWER, Zhejiang (CN); STATE GRID CORPORATION OF CHINA, Beijing (CN)

( * ) Notice: Subject to any disclaimer, the term of this patent is extended or adjusted under 35 U.S.C. 154(b) by 0 days.

(21) Appl. No.: 16/616,080

(22) PCT Filed: Dec. 27, 2018

(86) PCT No.: PCT/CN2018/124264
§ 371 (c)(1),
(2) Date: Nov. 22, 2019

(87) PCT Pub. No.: WO2019/105487
PCT Pub. Date: Jun. 6, 2019

(65) Prior Publication Data
US 2020/0303919 A1    Sep. 24, 2020

(30) Foreign Application Priority Data
Nov. 28, 2017   (CN) .......................... 2017 1 1219708

(51) Int. Cl.
*H02H 7/26* (2006.01)
*H04B 3/50* (2006.01)

(52) U.S. Cl.
CPC ............... *H02H 7/261* (2013.01); *H04B 3/50* (2013.01)

(58) Field of Classification Search
CPC .................................. H02H 7/261; H04B 3/50
See application file for complete search history.

(56) References Cited

U.S. PATENT DOCUMENTS

2016/0094225 A1*   3/2016  Lim .................. G06F 3/044
                                                         345/174

FOREIGN PATENT DOCUMENTS

| CN | 104242261 A | 12/2014 |
| CN | 105896489 A | 8/2016 |
| CN | 108092241 A | 5/2018 |

OTHER PUBLICATIONS

Zhang et al., "Influence of Different Fiber Channel Delay on Differential Protection" (Power System Protection and Control) vol. 38 No. 14, Jul. 16, 2010.

(Continued)

*Primary Examiner* — Kabir A Timory (57) ABSTRACT

Provided are a differential protection method and system, applied to a multi-terminal T-connection transmission line.

(Continued)

The method includes: selecting two slaves without a connection and connecting the two slaves to construct a slave group; determining a target slave and an auxiliary slave in the slave group, where a first communication path is connected along a channel one, a channel two and a channel three, and a second communication path is connected along the channel three, the channel two and the channel one; transmitting, by the target slave, two frames of messages, and acquiring a delay difference between a transceiving delay of the first communication path and a transceiving delay of the second communication path, where a first frame of messages is transmitted to the target slave via the first communication path, a second frame of messages is transmitted to the target slave via the second communication path.

10 Claims, 3 Drawing Sheets

(56) References Cited

OTHER PUBLICATIONS

Zhao et al., "A New Current Differential relay Scheme for Multi "T" Nodes Transmission Line" (Power System Protection and Control) vol. 38 No. 14, Jul. 16, 2010.
International Search Report for the International Patent Application No. PCT/CN2018/124264, dated Mar. 13, 2019, 6 pages.

* cited by examiner

DIFFERENTIAL PROTECTION METHOD AND SYSTEM

CROSS-REFERENCE TO RELATED APPLICATIONS

This is a National Stage Application, filed under 35 U.S.C. 371, of International Patent Application No. PCT/CN2018/124264, filed on Dec. 27, 2018, which claims priority to a Chinese patent application No. 201711219708.6 filed on Nov. 28, 2017, contents of both of which are incorporated herein by reference in their entireties.

TECHNICAL FIELD

The present application belongs to the field of differential protection, and for example, relates to a differential protection method and system.

BACKGROUND

Currently, for a multi-terminal T-connection transmission line, the main longitudinal current differential protection method is a sampling time adjustment method. In this method, it is difficult to find inconsistent transceiving delays of any channel in the multi-terminal T-connection transmission line.

SUMMARY

The following is a summary of the subject matter described herein in detail. This summary is not intended to limit the scope of the claims.

The present application provides a differential protection method and system applied to a multi-terminal T-connection transmission line in which a channel is added between a target slave and an auxiliary slave and a time difference is acquired through the added channel, thereby monitoring channel transceiving delays between a host and the target slave.

The present application provides a differential protection method applied to a multi-terminal T-connection transmission line. The multi-terminal T-connection transmission line includes a host and a plurality of slaves. The host is a protection device connected to one terminal of the multi-terminal T-connection transmission line, and the plurality of slaves are protection devices connected to terminals other than the one terminal of the multi-terminal T-connection transmission line. The differential protection method includes: connecting the host to the plurality of slaves, selecting two slaves without a connection between each other from the plurality of slaves, and connecting the two slaves to construct a slave group; configuring one slave in the slave group as a target slave and the other slave in the slave group as an auxiliary slave, where the target slave is configured to communicate with the host through a channel one, the host is configured to communicate with the auxiliary slave through a channel two, and the auxiliary slave is configured to communicate with the target slave through a channel three; a communication channel connected in a direction along the channel one, the channel two and the channel three is configured as a first communication path, and a communication channel connected in a direction along the channel three, the channel two and the channel one is configured as a second communication path; transmitting, by the target slave, two frames of messages, where a first frame of messages is transmitted to the target slave via the first communication path, and the target slave is configured to acquire a transceiving delay of the first communication path in a transmission process of the first frame of messages via the first communication path; a second frame of messages is transmitted to the target slave via the second communication path, and the target slave is configured to acquire a transceiving delay of the second communication path in a transmission process of the second frame of messages via the second communication path; and determining a delay difference according to a difference between the transceiving delay of the first communication path and the transceiving delay of the second communication path, where when the delay difference is greater than a preset difference, the host and the target slave give an alarm, and the target slave exits from a differential protection mode; or when the delay difference is less than or equal to the preset difference, the host and the target slave enter into the differential protection mode.

In another aspect, the present application further provides a differential protection system applied to a multi-terminal T-connection transmission line. The multi-terminal T-connection transmission line includes a host and a plurality of slaves. The host is a protection device connected to one terminal of the multi-terminal T-connection transmission line, and the plurality of slaves are protection devices connected to terminals other than the one terminal of the multi-terminal T-connection transmission line. The differential protection system includes a division unit, a communication unit, an acquisition unit and a determination unit. The division unit is configured to connect the host to the plurality of slaves, select two slaves without a connection between each other from the plurality of slaves, and connect the two slaves to construct a slave group. The communication unit is configured to take one slave in the slave group as a target slave and the other slave in the slave group as an auxiliary slave, where the target slave is configured to communicate with the host through a channel one, the host is configured to communicate with the auxiliary slave through a channel two, and the auxiliary slave is configured to communicate with the target slave through a channel three; a communication channel connected in a direction along the channel one, the channel two and the channel three is configured as a first communication path, and a communication channel connected in a direction along the channel three, the channel two and the channel one is configured as a second communication path. The acquisition unit is configured to enable the target slave to transmit two frames of messages, where a first frame of messages is transmitted to the target slave via the first communication path, and the target slave is configured to acquire a transceiving delay of the first communication path in a transmission process of the first frame of messages via the first communication path; a second frame of messages is transmitted to the target slave via the second communication path, and the target slave is configured to acquire a transceiving delay of the second communication path in a transmission process of the second frame of messages via the second communication path. The determination unit is configured to determine a delay difference according to a difference between the transceiving delay of the first communication path and the transceiving delay of the second communication path, in condition that the delay difference is greater than a preset difference, the host and the target slave give an alarm, and the target slave exits from a differential protection mode; or in condition that the delay difference is less than or equal to the preset difference, the host and the target slave enter into the differential protection mode.

Other aspects can be understood after the drawings and the detailed description are read and understood.

BRIEF DESCRIPTION OF DRAWINGS

To illustrate the technical solutions of the present application more clearly, the drawings used in the description of the embodiments will be simply described below, and the drawings described below illustrate part of the embodiments of the present application.

DETAILED DESCRIPTION

The structure of the present application will be further described below in conjunction with the drawings.

Figure 1:
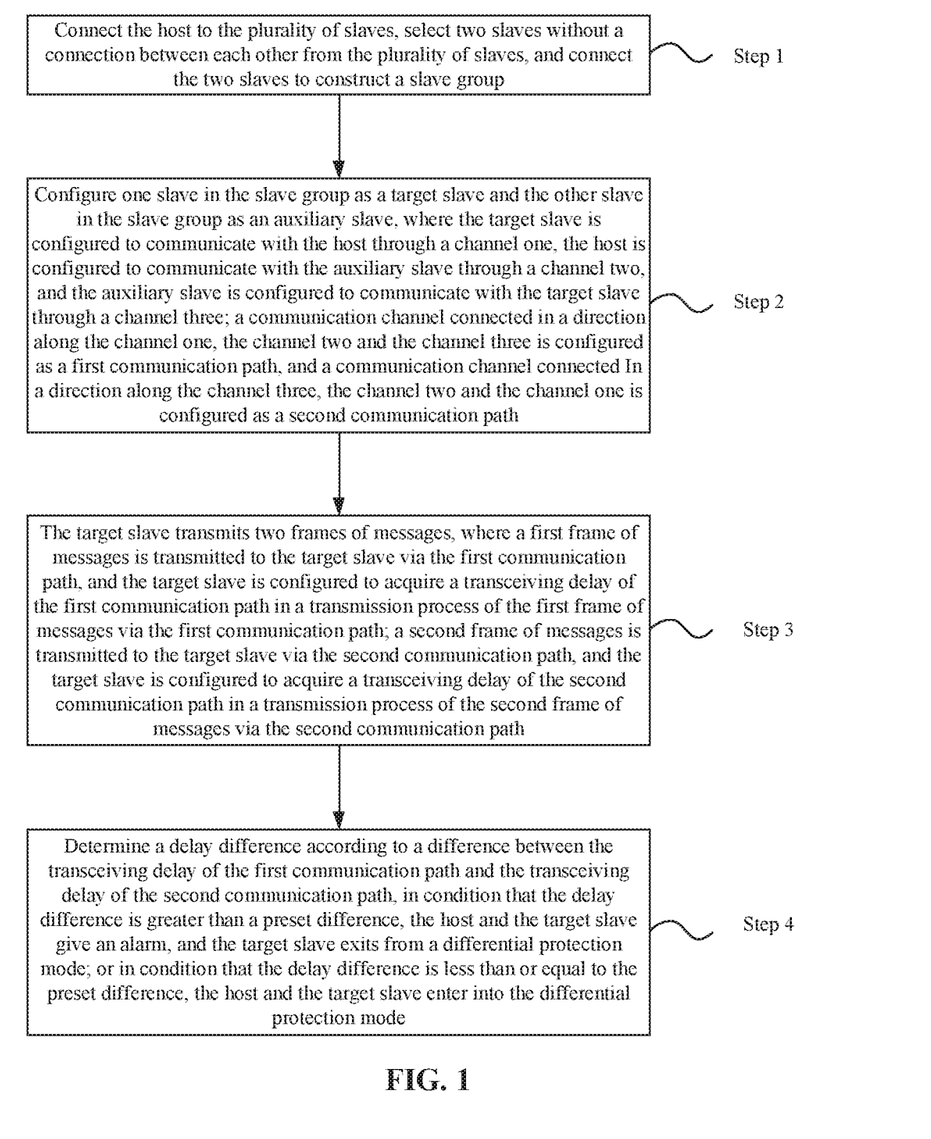
FIG. 1 is a flowchart of a differential protection method provided by the present application.

The present application provides a differential protection method applied to a multi-terminal T-connection transmission line. The multi-terminal T-connection transmission line includes a host and a plurality of slaves. The host is a protection device connected to one terminal of the multi-terminal T-connection transmission line, and the plurality of slaves are protection devices connected to terminals other than the one terminal of the multi-terminal T-connection transmission line. As shown in FIG. 1, the differential protection method includes steps 1 to 4.

In step 1, the host is connected to the plurality of slaves, two slaves without a connection between each other are selected from the plurality of slaves, and the two slaves are connected to construct a slave group.

In step 2, one slave in the slave group is configured as a target slave and the other slave in the slave group is configured as an auxiliary slave. The target slave is configured to communicate with the host through a channel one, the host is configured to communicate with the auxiliary slave through a channel two, and the auxiliary slave is configured to communicate with the target slave through a channel three. A communication channel connected in a direction along the channel one, the channel two and the channel three is configured as a first communication path, and a communication channel connected in a direction along the channel three, the channel two and the channel one is configured as a second communication path.

In step 3, the target slave transmits two frames of messages. A first frame of messages is transmitted to the target slave via the first communication path, and the target slave is configured to acquire a transceiving delay of the first communication path in a transmission process of the first frame of messages via the first communication path. A second frame of messages is transmitted to the target slave via the second communication path, and the target slave is configured to acquire a transceiving delay of the second communication path in a transmission process of the second frame of messages via the second communication path.

In step 4, a delay difference is determined according to a difference between the transceiving delay of the first communication path and the transceiving delay of the second communication path. In condition that the delay difference is greater than a preset difference, the host and the target slave give an alarm, and the target slave exits from a differential protection mode; or in condition that the delay difference is less than or equal to the preset difference, the host and the target slave enter into the differential protection mode.

In an embodiment, the protection device connected to the one terminal of the multi-terminal T-connection transmission line is configured as the host, and the protection devices connected to the terminals other than the one terminal of the multi-terminal T-connection transmission line are configured as the slaves. The differential protection method based on connections between the host and the slaves is described below. The host is connected to all the slaves and slaves without a connection between each other are connected to construct the slave group.

It is determined that the slave group includes the target slave and the auxiliary slave. The target slave is configured to communicate with the host through the channel one, the host is configured to communicate with the auxiliary slave through the channel two, and the auxiliary slave is configured to communicate with the target slave through the channel three. The communication channel connected in a direction along the channel one, the channel two and channel three is configured as the first communication path, and the communication channel connected in a direction along the channel three, the channel two and the channel one is configured as the second communication path.

The target slave transmits two frames of messages at the same time. The first frame of messages arrives at the host through the channel one, at the auxiliary slave through the channel two, and at the target slave through the channel three. The host, the auxiliary slave and the target slave each record a first time at which a first frame of messages is received. The transceiving delay of the first communication path is obtained by subtracting a first time at which the auxiliary slave receives the first frame of messages, a first time at which the host receives the first frame of messages and a first time at which the target slave transmits the first frame of messages from a first time at which the target slave receives the first frame of messages. A second frame of messages arrives at the auxiliary slave through the channel three, at the host through the channel two, and at the target slave through the channel one. Each of the auxiliary slave, the host and the target slave records a first time at which the second frame of messages is received. The transceiving delay of the second communication path is obtained by subtracting a first time at which the host receives the second frame of messages, a first time at which the auxiliary slave receives the second frame of messages and a first time at which the target slave transmits the second frame of messages from a first time at which the target slave receives the second frame of messages.

The delay difference is obtained according to the difference between the transceiving delay of the first communication path and the transceiving delay of the second communication path. In condition that the delay difference is greater than a set difference, it is determined that the transceiving delay of the first communication path is inconsistent with the transceiving delay of the second communication path, the target slave and the host alarm, and the target slave exits from the differential protection mode. When the delay difference is not greater than the set difference, it is determined that the transceiving delay of the first communication path is consistent with the transceiving delay of the second communication path, and the target slave and the host enter into the differential protection mode.

In the above differential protection method, the two slaves without the connection between each other are connected to construct the slave group, a communication connection between the slave group and the host is determined, a channel is added between the target slave and the auxiliary slave in the slave group, and a time difference is acquired through the added channel, thereby monitoring channel transceiving delays between the host and the target slave.

In an embodiment, the host is connected to each of the plurality of slaves through a multiplexed channel, and the slaves are connected to each other through a fiber channel.

In an embodiment, the host is connected to the each of the plurality of slaves through the multiplexed channel, and the two slaves are connected through the fiber channel. Since the two slaves are connected through the fiber channel, that is, a transceiving delay of the fiber channel is consistent, it is merely necessary to calculate transceiving delays of channels between the host and the slaves.

Figure 2:
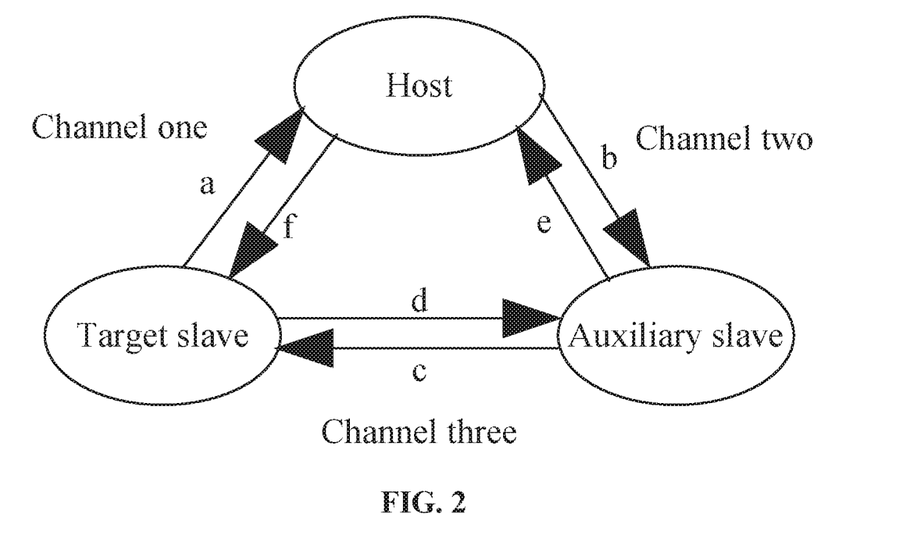
FIG. 2 is a diagram illustrating a connection between a host and a slave group provided by the present application.

As described above, the communication channel connected in a direction along the channel one, the channel two and the channel three is configured as the first communication path, and the communication channel connected in a direction along the channel three, the channel two and the channel one is configured as the second communication path. As shown in FIG. 2, the target slave transmits two frames of messages at a time $t_1$. The first frame of messages is transmitted to the target slave via the first communication path. The first frame of messages arrives at the host through the channel one with a delay a, and the first time at which the host receives the first frame of messages is recorded as a time $\Delta t_1$. The first frame of messages arrives at the auxiliary slave through the channel two with a delay b, and the first time at which the auxiliary slave receives the first frame of messages is recorded as a time $\Delta t_2$. The first frame of messages arrives at the target slave through the channel three with a delay c, and the first time at which the target slave receives the first frame of messages is recorded as a time $t_2$. Therefore, the transceiving delay of the first communication path is $a+b+c=t_2-t_1-\Delta t_1-\Delta t_2$.

The second frame of messages is transmitted to the target slave via the second communication path. The second frame of messages arrives at the auxiliary slave through the channel three with a delay d, and the first time at which the auxiliary slave receives the second frame of messages is recorded as a time $\Delta t_3$. The second frame of messages arrives at the host through the channel two with a delay e, and the first time at which the host receives the second frame of messages is recorded as a time $\Delta t_4$. The second frame of messages arrives at the target slave through the channel one with a delay f, and the first time at which the target slave receives the second frame of messages is recorded as a time $t_3$. Therefore, the transceiving delay of the second communication path is $d+e+f=t_3-t_1-\Delta t_3-\Delta t_4$.

The channel three between the target slave and the auxiliary slave is the fiber channel, that is, c=d, and the delay difference is obtained according to the difference between the transceiving delay of the first communication path and the transceiving delay of the second communication path, so the delay difference is $(a-f)+(b-e)=(a-f)+(b-e)+(c-d)=t_3-\Delta t_3-\Delta t_4-t_2+\Delta t_1+\Delta t_2$.

In condition that the delay difference is greater than the set difference, it is determined that between the host and the target slave, the transceiving delay of the first communication path is inconsistent with the transceiving delay of the second communication path, and the target slave and the host alarm. In condition that the delay difference is not greater than the set difference, it is determined that between the host and the target slave, the transceiving delay of the first communication path is consistent with the transceiving delay of the second communication path, and the host and the target slave enter into the differential protection mode.

In an embodiment, the step 1 includes determining a number of the plurality of slaves according to a number of terminals of the multi-terminal T-connection transmission line; and in condition that the number of the plurality of slaves is an odd number and a separate slave is not connected to the auxiliary slave, connecting the separate slave to the host through a standby channel.

In an implementation, the number of slaves is determined by the number of terminals of the multi-terminal T-connection transmission line; in condition that the number of slaves is an odd number, the separate slave is not connected to the auxiliary slave, the slave is connected to the host through the standby channel, and the time difference is acquired through the standby channel, thereby monitoring channel transceiving delays between the host and the separate slave.

Figure 3:
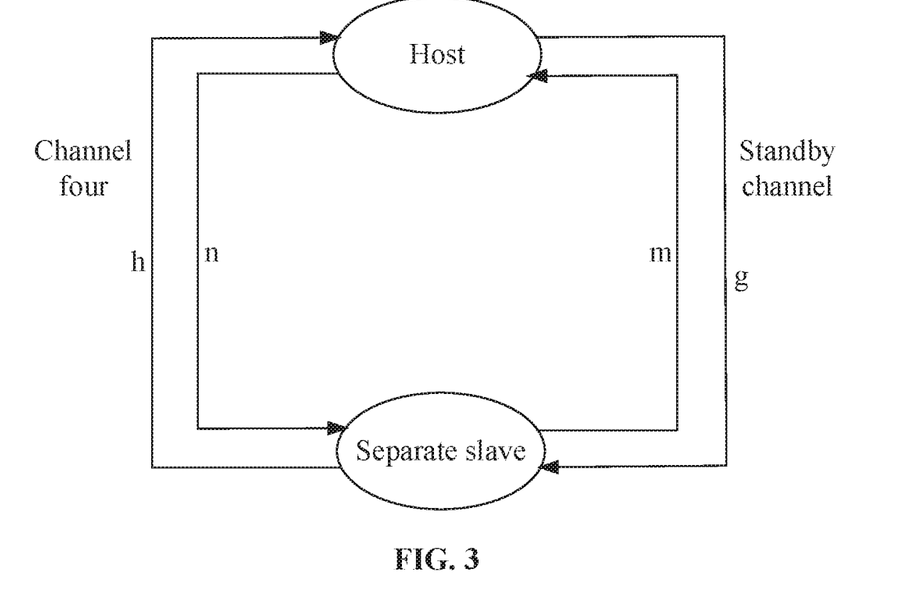
FIG. 3 is a diagram illustrating a connection between a host and a separate slave provided by the present application.

As shown in FIG. 3, the separate slave is configured to communicate with the host through a channel four and the separate slave also is configured to communicate with the host through the standby channel. A fourth channel is formed along the channel four and the standby channel, and a fifth channel is formed along the standby channel and the channel four.

The separate slave transmits two frames of messages as a third frame of messages and a fourth frame of messages at a time $t_4$. The third frame of messages first arrives at the host through the channel four with a delay h, and a first time at which the host receives the third frame of messages is recorded as $\Delta t_5$. The third frame of messages then arrives at the separate slave through the standby channel with a delay g, and a first time at which the separate slave receives the third frame of messages is recorded as $t_5$. Therefore, a transceiving delay of the fourth channel is $h+g=t_5-\Delta t_5-t_4$.

The fourth frame of messages first arrives at the host through the standby channel with a delay m, and the first time at which the host receives the fourth frame of messages is recorded as $\Delta t_6$. The fourth frame of messages then arrives at the separate slave through the channel four with a delay n, and the first time at which the separate slave receives the fourth frame of messages is recorded as $t_6$. Therefore, a transceiving delay of the fifth channel is $m+n=t_6-t_6-t_4$. The delay difference is obtained according to the transceiving delay of the fourth channel and the transceiving delay of the fifth channel, which is $(h-n)+(m-g)=t_5-\Delta t_5-t_6-\Delta t_6$.

In condition that the delay difference is greater than the set difference, it is determined that between the host and the separate slave, the transceiving delay of the fourth channel is inconsistent with the transceiving delay of the fifth channel, the separate slave and the host alarm, and the separate slave exits from the differential protection mode. In condition that the delay difference is not greater than the set difference, it is determined that between the host and the separate slave, the transceiving delay of the fourth channel is consistent with the transceiving delay of the fifth channel, and the host and the separate slave enter into the differential protection mode.

In an embodiment, the differential protection method further includes that in condition that the multiplexed channel between the host and the target slave is faulty, the target slave performs sampling synchronization and message transmission through the auxiliary slave.

In condition that the multiplexed channel between the host and the separate slave is faulty, the separate slave performs the sampling synchronization and the message transmission through the standby channel.

In an implementation, when the multiplexed channel between the host and the target slave is faulty, the target slave may perform the message transmission through the auxiliary slave. The target slave transmits its own sampling time and messages to the auxiliary slave through the channel three, the auxiliary slave transmits a first time at which the messages are received and the messages to the host through the channel two, and the host obtains a delay of the channel three and a delay of the channel two according to differences between a sampling time of the host, the first time at which the auxiliary slave receives the messages and the sampling time of the target slave. The target slave automatically adjusts its own sampling time according to the obtained delays of the channel two and the channel three to synchronize the sampling time.

When the multiplexed channel between the host and the separate slave is faulty, the separate slave may perform the message transmission through the standby channel. The separate slave transmits its own sampling time and messages to the host through the standby channel, and the host obtains a delay of the standby channel according to a difference between a sampling time of the host and the sampling time of the separate slave. The separate slave automatically adjusts its own sampling time according to the obtained delay of the standby channel to synchronize the sampling time.

When the multiplexed channel between the host and the target slave or separate slave is faulty, the sampling synchronization and the message transmission may be performed through the auxiliary slave or the standby channel, thereby ensuring operations of the multi-terminal T-connection transmission line and quick differential protection in case of faults.

In an embodiment, the host is connected to the each of the plurality of slaves through the multiplexed channel in the following manner: a master channel pressure plate and a slave channel pressure plate corresponding to the master channel pressure plate are disposed in the multiplexed channel, a target master channel pressure plate is selected from the master channel pressure plate, and a target slave channel pressure plate corresponding to the target master channel pressure plate is selected from the slave channel pressure plate. A slave corresponding to the target slave channel pressure plate and the host perform one of operations described below.

In response to determining that both the target master channel pressure plate and the target slave channel pressure plate enter into use, the slave corresponding to the target slave channel pressure plate and the host enter into the differential protection mode. In response to determining that both the target master channel pressure plate and the target slave channel pressure plate exit from use, the slave corresponding to the target slave channel pressure plate exits from the differential protection mode. In response to determining that one of the target master channel pressure plate and the target slave channel pressure plate enters into use, another of the target master channel pressure plate and the target slave channel pressure plate exits from use, the slave corresponding to the target slave channel pressure plate and the host give an alarm, and the slave corresponding to the target slave channel pressure plate exits from the differential protection mode.

In an implementation, taking a single host and 16 slaves as an example, the host is connected to each of the 16 slaves through the multiplexed channel. A first master channel pressure plate and a first slave channel pressure plate are disposed in the multiplexed channel between the host and a first slave. A second master channel pressure plate and a second slave channel pressure plate are disposed in the multiplexed channel between the host and a second slave. A third master channel pressure plate and a third slave channel pressure plate are disposed in the multiplexed channel between the host and a third slave. The rest can be done in the same manner. A sixteenth master channel pressure plate and a sixteenth slave channel pressure plate are disposed in the multiplexed channel between the host and a sixteenth slave.

Taking a host and a fifth slave as an example, in condition that a fifth master channel pressure plate and a fifth slave channel pressure plate enter into use, the host and the fifth slave enter into the differential protection mode.

In condition that the fifth master channel pressure plate and the fifth slave channel pressure plate exit from use, the fifth slave exits from the differential protection mode.

In condition that the fifth master channel pressure plate and the third slave channel pressure plate enter into use, since the master channel pressure plate and the slave channel pressure plate have inconsistent use conditions, the host and the third slave give an alarm, and the third slave corresponding to the third slave channel pressure plate exits from the differential protection mode.

If the fifth master channel pressure plate and the third slave channel pressure plate exit from use, since the master channel pressure plate and the slave channel pressure plate have inconsistent use conditions, the host and the fifth slave give an alarm, and the fifth slave corresponding to the fifth slave channel pressure plate exits from the differential protection mode.

The master channel pressure plate and the slave channel pressure plate are disposed in the multiplexed channel, and the master channel pressure plate and the slave channel pressure plate enter into and exit from use so that the slaves enter into and exit from operations.

The present application provides the differential protection method applied to the multi-terminal T-connection transmission line. The method includes: selecting the two slaves without the connection between each other from the slaves and connecting the two slaves to construct the slave group; determining the target slave and the auxiliary slave in the slave group, where the first communication path is connected along the channel one, the channel two and the channel three, and the second communication path is connected along the channel three, the channel two and the channel one; transmitting, by the target slave, the two frames of messages, and acquiring the delay difference between the transceiving delay of the first communication path and the transceiving delay of the second communication path, where the first frame of messages is transmitted to the target slave via the first communication path, the second frame of messages is transmitted to the target slave via the second communication path, and when the delay difference is greater than the preset difference, the host and the target slave give an alarm, and the target slave exits from the differential protection mode. Based on the differential protection method, the two slaves without the connection between each other are connected to construct the slave group, the communication connection between the slave group (including the target slave and the auxiliary slave) and the host is determined, the channel is added between the target slave and the auxiliary slave, and the time difference is acquired through the added channel, thereby monitoring the channel transceiving delays between the host and the target slave.

Figure 4:
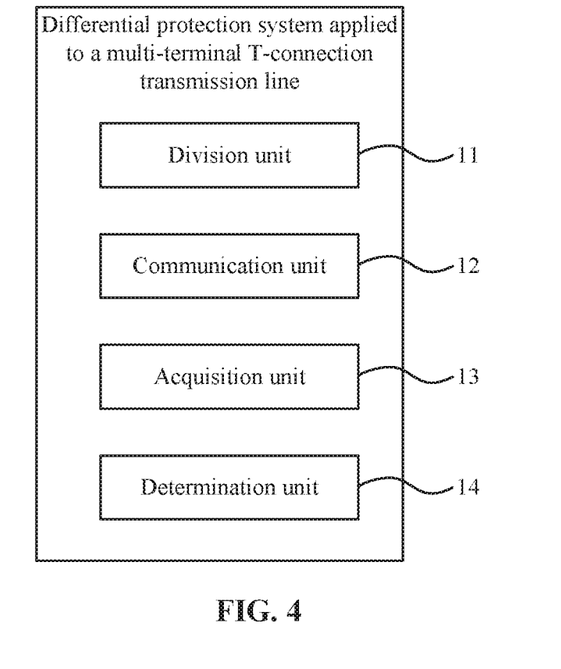
FIG. 4 is a structural diagram of a differential protection system provided by the present application.

The present application further provides a differential protection system applied to a multi-terminal T-connection transmission line. The multi-terminal T-connection transmission line includes a host and a plurality of slaves. The host is a protection device connected to one terminal of the multi-terminal T-connection transmission line, and the plurality of slaves are protection devices connected to terminals other than the one terminal of the multi-terminal T-connection transmission line. As shown in FIG. 4, the differential protection system includes a division unit 11, a communication unit 12, an acquisition unit 13 and a determination unit 14. The division unit 11 is configured to connect the host to the plurality of slaves, select two slaves without a connection between each other from the plurality of slaves, and connect the two slaves to construct a slave group.

The communication unit 12 is configured to take one slave in the slave group as a target slave and the other slave in the slave group as an auxiliary slave. The target slave is configured to communicate with the host through a channel one, the host is configured to communicate with the auxiliary slave through a channel two, and the auxiliary slave is configured to communicate with the target slave through a channel three. A communication channel connected in a direction along the channel one, the channel two and the channel three is configured as a first communication path, and a communication channel connected in a direction along the channel three, the channel two and the channel one is configured as a second communication path.

The acquisition unit 13 is configured to enable the target slave to transmit two frames of messages. A first frame of messages is transmitted to the target slave via the first communication path, and the target slave is configured to acquire a transceiving delay of the first communication path in a transmission process of the first frame of messages via the first communication path. A second frame of messages is transmitted to the target slave via the second communication path, and the target slave is configured to acquire a transceiving delay of the second communication path in a transmission process of the second frame of messages via the second communication path.

The determination unit 14 is configured to determine a delay difference according to a difference between the transceiving delay of the first communication path and the transceiving delay of the second communication path. In condition that the delay difference is greater than a preset difference, the host and the target slave give an alarm, and the target slave exits from a differential protection mode; or in condition that the delay difference is less than or equal to the preset difference, the host and the target slave enter into the differential protection mode.

In an implementation, the following processing is performed using the units described above. The division unit 11 is configured to connect the host to all the slaves and connect slaves without a connection between each other to construct the slave group.

The communication unit 12 is configured to determine that the slave group includes the target slave and the auxiliary slave. The target slave is configured to communicate with the host through the channel one, the host is configured to communicate with the auxiliary slave through the channel two, and the auxiliary slave is configured to communicate with the target slave through the channel three. The communication channel connected in a direction along the channel one, the channel two and the channel three is configured as the first communication path, and the communication channel connected in a direction along the channel three, the channel two and the channel one is configured as the second communication path.

The acquisition unit 13 is configured to enable the target slave to transmit the two frames of messages at the same time. The first frame of messages arrives at the host through the channel one, at the auxiliary slave through the channel two, and at the target slave through the channel three. The host, the auxiliary slave and the target slave each record a first time at which a first frame of messages is received. The transceiving delay of the first communication path is obtained by subtracting a first time at which the auxiliary slave receives the first frame of messages, a first time at which the host receives the first frame of messages and a first time at which the target slave transmits the first frame of messages from a first time at which the target slave receives the first frame of messages. A second frame of messages arrives at the auxiliary slave through the channel three, at the host through the channel two, and at the target slave through the channel one. The auxiliary slave, the host and the target slave each record a first time at which the second frame of messages is received. The transceiving delay of the second communication path is obtained by subtracting a first time at which the host receives the second frame of messages, a first time at which the auxiliary slave receives the second frame of messages and a first time at which the target slave transmits the second frame of messages from a first time at which the target slave receives the second frame of messages.

The determination unit 14 is configured to obtain the delay difference according to the difference between the transceiving delay of the first communication path and the transceiving delay of the second communication path. In condition that the delay difference is greater than a set difference, it is determined that the transceiving delay of the first communication path is inconsistent with the transceiving delay of the second communication path, the target slave and the host alarm, and the target slave exits from the differential protection mode. In condition that the delay difference is not greater than the set difference, it is determined that the transceiving delay of the first communication path is consistent with the transceiving delay of the second communication path, and the target slave and the host enter into the differential protection mode.

Based on the differential protection system, the division unit 11 connects the two slaves without the connection between each other through a channel to construct the slave group which includes the target slave and the auxiliary slave, the communication unit 12 determines a communication connection between the slave group and the host, the division unit 11 adds a channel between the target slave and the auxiliary slave, and the time difference is acquired through the added channel, thereby monitoring the channel transceiving delays between the host and the target slave.

In an embodiment, the host is connected to each of the plurality of slaves through a multiplexed channel, and the slaves are connected to each other through a fiber channel.

In an implementation, the host is connected to the each of the plurality of slaves through the multiplexed channel, and the two slaves are connected through the fiber channel. Since the two slaves are connected through the fiber channel, that is, a transceiving delay of the fiber channel is consistent, it is only necessary to calculate transceiving delays of channels between the host and the slaves.

In an embodiment, the division unit 11 is further configured to determine a number of the plurality of slaves according to a number of terminals of the multi-terminal T-connection transmission line; and in condition that the number of the plurality of slaves is an odd number and a separate slave is not connected to the auxiliary slave, connect the separate slave to the host through a standby channel.

In an implementation, the number of slaves is determined by the number of terminals of the multi-terminal T-connection transmission line; in condition that the number of slaves is an odd number, the separate slave is not connected to the auxiliary slave, the division unit 11 connects the separate slave to the host through the standby channel, and the time difference is acquired through the standby channel, thereby monitoring channel transceiving delays between the host and the separate slave.

In an embodiment, in the differential protection system, when the multiplexed channel between the host and the target slave is faulty, the target slave performs sampling synchronization and message transmission through the auxiliary slave.

When the multiplexed channel between the host and the target slave is faulty, the target slave may perform the message transmission through the auxiliary slave. The target slave transmits its own sampling time and messages to the auxiliary slave through the channel three, the auxiliary slave transmits a first time at which the messages are received and the messages to the host through the channel two, and the host obtains a delay of the channel three and a delay of the channel two according to differences between a sampling time of the host, the first time at which the auxiliary slave receives the messages and the sampling time of the target slave. The target slave automatically adjusts its own sampling time according to the obtained delays of the channel two and the channel three to synchronize the sampling time.

The present application provides the differential protection system applied to the multi-terminal T-connection transmission line. The system includes the division unit, the communication unit, the acquisition unit and the determination unit. The division unit is configured to connect the host to the plurality of slaves, select the two slaves without the connection between each other from the plurality of slaves, connect the two slaves to construct the slave group. The communication unit is configured to: determine one slave in the slave group as the target slave and the other slave in the slave group as the auxiliary slave, enable the target slave to communicate with the host through the channel one, enable the host to communicate with the auxiliary slave through the channel two, and enable the auxiliary slave to communicate with the target slave through the channel three. The communication channel connected in a direction along the channel one, the channel two and the channel three is configured as the first communication path, and the communication channel connected in a direction along the channel three, the channel two and the channel one is configured as the second communication path. The acquisition unit is configured to enable the target slave to transmit the two frames of messages. The first frame of messages is transmitted to the target slave via the first communication path, and the target slave is configured to acquire the transceiving delay of the first communication path in the transmission process of the first frame of messages via the first communication path. The second frame of messages is transmitted to the target slave via the second communication path, and the target slave is configured to acquire the transceiving delay of the second communication path in the transmission process of the second frame of messages via the second communication path. The determination unit is configured to determine the delay difference according to the difference between the transceiving delay of the first communication path and the transceiving delay of the second communication path. When the delay difference is greater than the preset difference, the host and the target slave give an alarm, and the target slave exits from the differential protection mode. Based on the differential protection system, the division unit is configured to add the channel between the target slave and the auxiliary slave and the time difference is acquired through the added channel, thereby monitoring the channel transceiving delays between the host and the target slave.

The serial numbers in the embodiments described above are merely for ease of description and do not indicate sequences in an assembly or use process of the various components.

What is claimed is:

1. A differential protection method, applied to a multi-terminal T-connection transmission line, wherein the multi-terminal T-connection transmission line comprises a host and a plurality of slaves, wherein the host is a protection device connected to one terminal of the multi-terminal T-connection transmission line, and the plurality of slaves are protection devices connected to terminals other than the one terminal of the multi-terminal T-connection transmission line; and the differential protection method comprises:

connecting the host to the plurality of slaves, selecting two slaves without a connection between each other from the plurality of slaves, and connecting the two slaves to construct a slave group;

configuring one slave in the slave group as a target slave and the other slave in the slave group as an auxiliary slave, wherein the target slave is configured to communicate with the host through a channel one, the host is configured to communicate with the auxiliary slave through a channel two, and the auxiliary slave is configured to communicate with the target slave through a channel three; a communication channel connected in a direction along the channel one, the channel two and the channel three is configured as a first communication path, and a communication channel connected in a direction along the channel three, the channel two and the channel one is configured as a second communication path;

transmitting, by the target slave, two frames of messages, wherein a first frame of messages is transmitted to the target slave via the first communication path, and the target slave is configured to acquire a transceiving delay of the first communication path in a transmission process of the first frame of messages via the first communication path; wherein a second frame of messages is transmitted to the target slave via the second communication path, and the target slave is configured to acquire a transceiving delay of the second communication path in a transmission process of the second frame of messages via the second communication path; and determining a delay difference according to a difference between the transceiving delay of the first communication path and the transceiving delay of the second communication path, wherein in condition that the delay difference is greater than a preset difference, the host and the target slave give an alarm, and the target slave exits from a differential protection mode; or in condition that the delay difference is less than or equal to the preset difference, the host and the target slave enter into the differential protection mode.

2. The differential protection method of claim 1, wherein the host is connected to each of the plurality of slaves through a multiplexed channel, and the plurality of slaves are connected to each other through a fiber channel.

3. The differential protection method of claim 1, wherein the connecting the host to the plurality of slaves, selecting the two slaves without the connection between each other from the plurality of slaves, and connecting the two slaves to construct the slave group comprises:
determining a number of the plurality of slaves according to a number of terminals of the multi-terminal T-connection transmission line; and
in condition that the number of the plurality of slaves is an odd number and a separate slave is not connected to the auxiliary slave, connecting the separate slave to the host through a standby channel.

4. The differential protection method of claim 2, further comprising: in condition that the multiplexed channel between the host and the target slave is faulty, performing, by the target slave, sampling synchronization and message transmission through the auxiliary slave.

5. The differential protection method of claim 3, further comprising:
in condition that a multiplexed channel between the host and the separate slave is faulty, performing, by the separate slave, sampling synchronization and message transmission through the standby channel.

6. The differential protection method of claim 2, wherein the host is connected to the each of the plurality of slaves through the multiplexed channel in the following manner:
master channel pressure plates and slave channel pressure plates corresponding to the master channel pressure plates are disposed in the multiplexed channel, a target master channel pressure plate is selected from the master channel pressure plates, and a target slave channel pressure plate corresponding to the target master channel pressure plate is selected from the slave channel pressure plates;
wherein a slave corresponding to the target slave channel pressure plate and the host perform one of the following operations:
in response to determining that both the target master channel pressure plate and the target slave channel pressure plate enter into use, the slave corresponding to the target slave channel pressure plate and the host enter into the differential protection mode;
in response to determining that both the target master channel pressure plate and the target slave channel pressure plate exit from use, the slave corresponding to the target slave channel pressure plate exits from the differential protection mode; or
in response to determining that one of the target master channel pressure plate and the target slave channel pressure plate enters into use, and another of the target master channel pressure plate and the target slave channel pressure plate exits from use, the slave corresponding to the target slave channel pressure plate and the host give an alarm, and the slave corresponding to the target slave channel pressure plate exits from the differential protection mode.

7. A differential protection system, applied to a multi-terminal T-connection transmission line, wherein the multi-terminal T-connection transmission line comprises a host and a plurality of slaves, wherein the host is a protection device connected to one terminal of the multi-terminal T-connection transmission line, and the plurality of slaves are protection devices connected to terminals other than the one terminal of the multi-terminal T-connection transmission line; and the differential protection system comprises:
a division unit, which is configured to connect the host to the plurality of slaves, select two slaves without a connection between each other from the plurality of slaves, and connect the two slaves to construct a slave group;
a communication unit, which is configured to configured one slave in the slave group as a target slave and the other slave in the slave group as an auxiliary slave, wherein the target slave is configured to communicate with the host through a channel one, the host is configured to communicate with the auxiliary slave through a channel two, and the auxiliary slave is configured to communicate with the target slave through a channel three; a communication channel connected in a direction along the channel one, the channel two and the channel three is configured as a first communication path, and a communication channel connected in a direction along the channel three, the channel two and the channel one is configured as a second communication path;
an acquisition unit, configured to enable the target slave to transmit two frames of messages, wherein a first frame of messages is transmitted to the target slave via the first communication path, and the target slave is configured to acquire a transceiving delay of the first communication path in a transmission process of the first frame of messages via the first communication path; a second frame of messages is transmitted to the target slave via the second communication path, and the target slave is configured to acquire a transceiving delay of the second communication path in a transmission process of the second frame of messages via the second communication path; and
a determination unit, configured to determine a delay difference according to a difference between the transceiving delay of the first communication path and the transceiving delay of the second communication path, wherein in condition that the delay difference is greater than a preset difference, the host and the target slave give an alarm, and the target slave exits from a differential protection mode; or in condition that the delay difference is less than or equal to the preset difference, the host and the target slave enter into the differential protection mode.

8. The system of claim 7, wherein the host is connected to each of the plurality of slaves through a multiplexed channel, and the plurality of slaves are connected to each other through a fiber channel.

9. The system of claim 7, wherein the division unit is further configured to:
determine a number of the plurality of slaves according to a number of terminals of the multi-terminal T-connection transmission line; and
in condition that the number of the plurality of slaves is an odd number in and a separate slave is not connected to the auxiliary slave, connect the separate slave to the host through a standby channel.

10. The system of claim 9, wherein
when in condition that a multiplexed channel between the host and the target slave is faulty, the target slave performs sampling synchronization and message transmission through the auxiliary slave.

\* \* \* \* \*